United States Patent
Blough et al.

[15] 3,677,229
[45] July 18, 1972

[54] LIVESTOCK CONFINEMENT HOUSE WITH IMPROVED ENVIRONMENTAL CONTROL

[72] Inventors: Ronald S. Blough, Fairfield; Norval Curry, Ames, both of Iowa

[73] Assignee: Fairfield Engineering & Manufacturing Company, Fairfield, Iowa

[22] Filed: July 30, 1970

[21] Appl. No.: 59,654

[52] U.S. Cl..................................................119/16, 119/28
[51] Int. Cl.......................................A01k 01/00, F24f 07/06
[58] Field of Search....................119/16, 20, 22, 27, 28, 15

[56] References Cited

UNITED STATES PATENTS

| 3,148,663 | 9/1964 | Conover | 119/16 |
| 3,530,831 | 9/1970 | Conover | 119/16 |
| 3,469,816 | 9/1969 | Blough et al. | 249/118 |
| 3,213,828 | 10/1965 | Sorensen | 119/20 |
| 3,225,739 | 12/1965 | Brodrick | 119/27 |
| 3,228,376 | 1/1966 | Conover | 119/28 |

Primary Examiner—Hugh R. Chamblee
Attorney—Wolfe, Hubbard, Leydig, Voit & Osann, Ltd.

[57] ABSTRACT

A livestock confinement house having a waste disposal pit and a slotted concrete floor positioned over the pit. The slotted floor comprises a plurality of elongated concrete slats spanning the pit, with each of the slats having a conduit positioned therein to reinforce the concrete. The conduits are interconnected to form a floor circulation system through which a temperature controlling fluid may pass to alternately heat or cool the floor. Ventilating ducts communicating the exterior of the building with the pit coupled with reversible ventilating fans in the roof of the house permit air circulation either upwardly or downwardly through the slotted concrete floor. Valves in the floor circulation system permit selective temperature regulation or complete blocking of sections of the house floor from the circulation system.

12 Claims, 9 Drawing Figures

Patented July 18, 1972
3,677,229
4 Sheets-Sheet 1
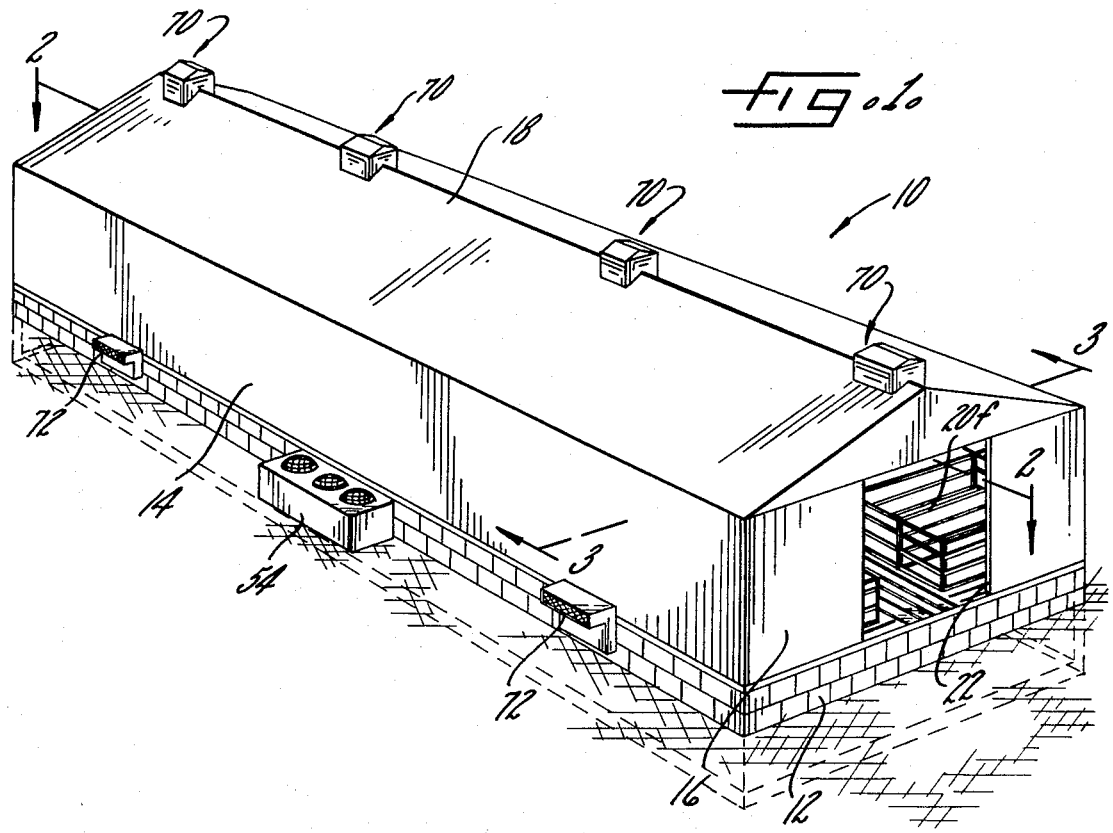
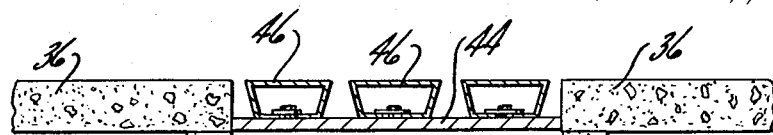
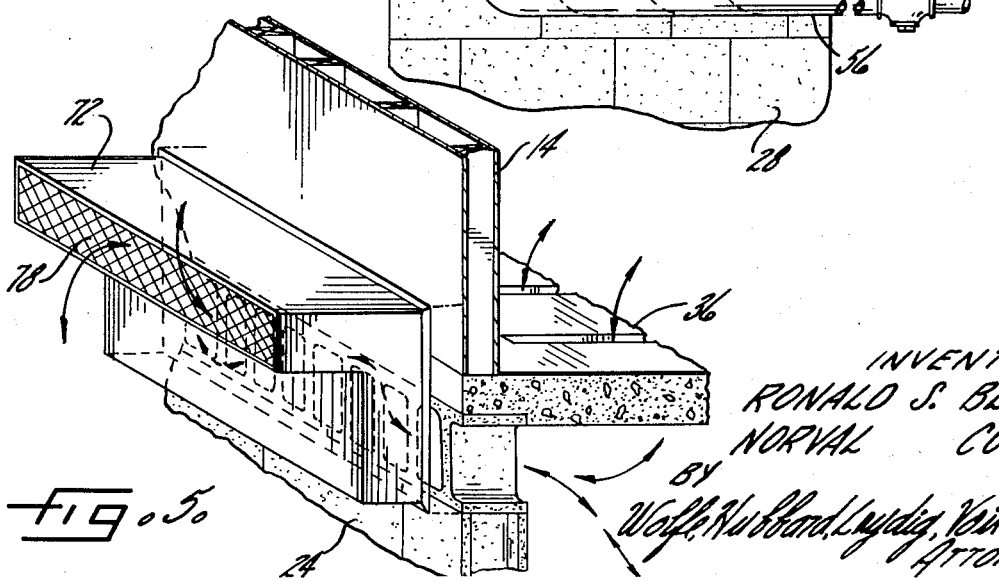
INVENTORS.
RONALD S. BLOUGH
NORVAL CURRY
BY Wolfe, Hubbard, Leydig, Voit & Osann
ATTORNEYS.

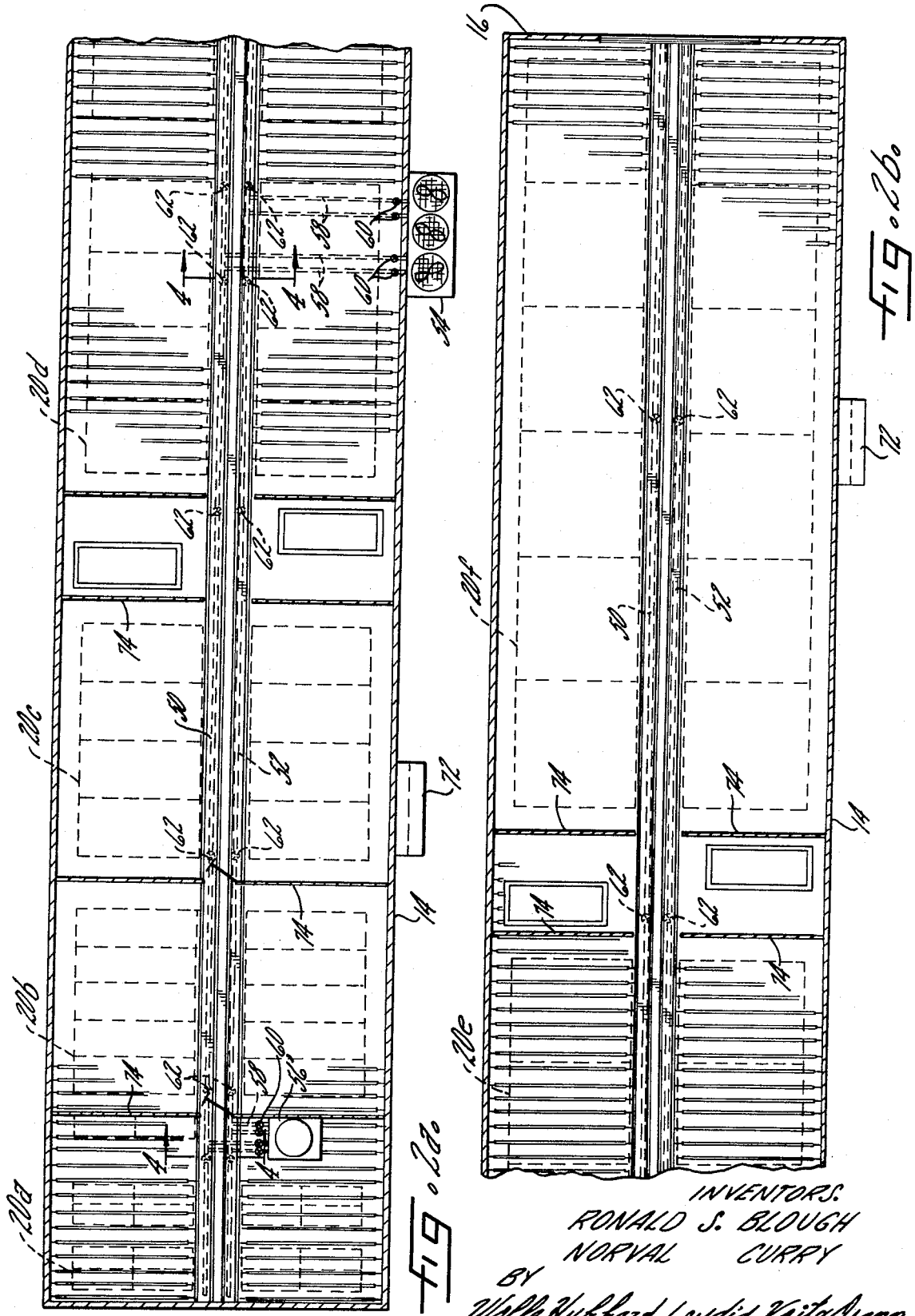

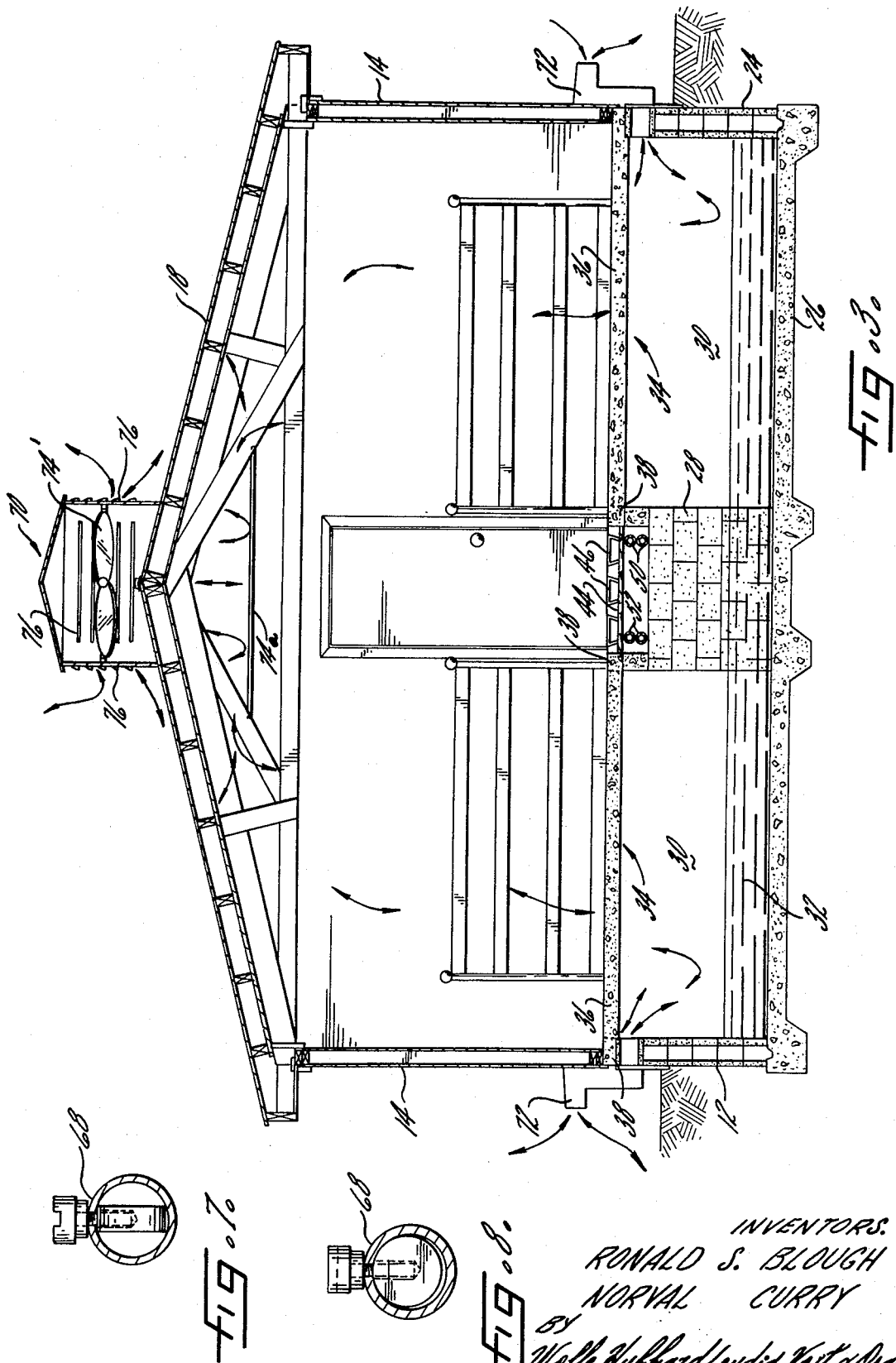

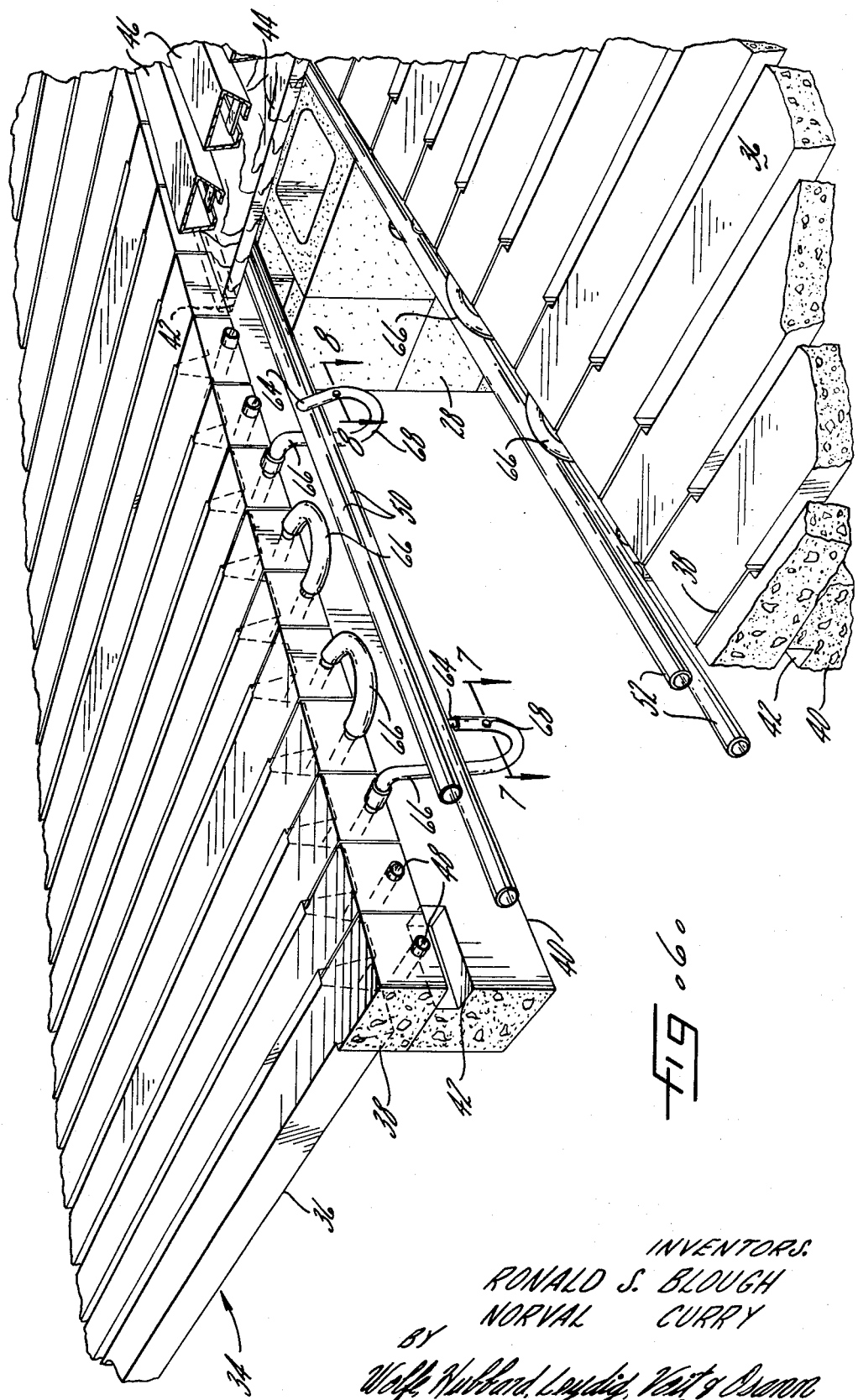

LIVESTOCK CONFINEMENT HOUSE WITH IMPROVED ENVIRONMENTAL CONTROL

BACKGROUND OF THE INVENTION

This invention relates to farm buildings and in particular to livestock confinement houses. area, a Modern techniques in feeding and finishing livestock for market require a clean, sanitary and relatively dry environment in the animal confinement conduits which means that litter and animal waste must be kept to converted minimum. For heavier livestock, such as feeder cattle and hogs, the litter and animal waste problem has been significantly reduced through the use of floors having a plurality of relatively narrow slots through which the wastes may pass, but which are not sufficiently wide to adversely affect the footing of the animals.

The optimum feeding and finishing conditions for livestock, and particularly hogs and pigs, are a function of the total environment in which they live. Therefore, proper temperature and ventilation control are important to their growth.

Accordingly, it is the primary aim of the present invention to provide a livestock confinement house in which the confinement environment, including temperature control, air circulation, and waste disposal are arranged for optimum economic advantage.

Another object of the invention is to provide a confinement house having a slotted concrete floor with a plurality of conduits embedded therein through which a temperature controlling fluid may pass, and with the conduits additionally providing reinforcing strengths for the floor.

A further object of the invention is to provide a confinement house having a waste disposal pit beneath a slotted floor of the above type for receiving animal waste which may be converted into liquid fertilizer.

Still another object of the invention is to provide a confinement house of the above type having a number of isolatable sections to permit independent environmental control for livestock, and particularly hogs and pigs, to accommodate the needs of animals of varying ages.

Other objects and advantages of the invention will become apparent from reading the ensuing specification and upon reference to the accompanying drawings.

BRIEF DESCRIPTION OF THE DRAWINGS

FIG. 1 is a perspective of a livestock confinement house embodying the features of the present invention;

FIGS. 2a and 2b comprise a section taken along the plane 2—2 of FIG. 1;

FIG. 3 is an end section taken along the plane 3—3 of FIG. 1;

FIG. 4 is an enlarged partial section taken along planes 4—4 in FIG. 2a;

FIG. 5 is a fragmentary perspective, partially in section, illustrating the ventilating means communicating the outside of the building with the waste disposal pit.

FIG. 6 is a fragmentary perspective, partially in section, illustrating the slotted concrete floor and floor circulation system;

FIG. 7 is a section taken along plane 7—7 illustrating a fluid balancing valve in an open position; and FIG. 8 is a section taken along plane 8—8 of FIG. 6 illustrating a fluid balancing valve in a closed position.

DESCRIPTION OF THE PREFERRED EMBODIMENT

Turning now to the drawings, there is shown in FIG. 1 a livestock confinement building 10 having a conventional concrete block foundation 12, side walls 14, end walls 16 and a roof 18. The house 10 is a relatively long structure compared to its width, which lends itself to efficient production methods of feeding and finishing pigs for market. Newly born pigs are placed in the extreme left hand portion of the house as shown in FIG. 1 and are gradually moved toward the right as they continue to grow. This can more easily be seen in FIGS. 2a and 2b which show confining pens 20a through 20f which are of increasing size to accommodate groups of progressively older and larger animals. In FIG. 1, a perspective view of the pens 20f is shown through an exit door 22 in the end wall 16. After the pigs have reached market size, they are removed from the house through the exit door 22 and are taken to market.

To support the house 10, the foundation 12 preferably extends below the ground surface elevation. As shown in FIG. 3, the foundation 12 may be constructed of conventional concrete blocks 24 laid on a poured concrete floor slab 26. For central support of the house, center segments 28 comprised of concrete blocks are placed at regular intervals along the longitudinal center portion of the house.

In addition to providing support for the floor as well as the rest of the house, the foundation walls 12 and the floor slab 26 also define a waste disposal pit 30 for receiving the litter and animal waste of the livestock confined in the house. The inner surface of the foundation walls 12 as well as the floor slab 26 may require a coating of a moisture proofing substance to prevent leakage through the concrete.

Pursuant to one aspect of the present invention, the animal confinement house 10 is provided with a slotted concrete floor 34 above the waste disposal pit 30, as is best shown in FIGS. 3 and 6. To facilitate the removal of litter and animal waste from the house with a minimum of labor, the slotted floor 34 is comprised of a plurality of adjacently positioned concrete slats 36, each of which has the cross-sectional shape of an inverted truncated triangle through the major portion of the length thereof. It will be understood that the litter and solid animal wastes are tramped by the feet of the animals through the slots defined between adjacent slats 36. To maintain the desired width of the slots, the ends 38 of the slats 36 have a rectangular shape which permits adjacent slats to lie in an abutting or nearly abutting relationship as is clearly illustrated in FIG. 6. Although each of the slats is independent of the others and can be removed for access to the pit below or for replacement if necessary, groups of individual slats may be simultaneously poured in place through the use of a mold which is the subject of U.S. Pat. No. 3,469,816.

As shown in FIG. 3, the exterior end portion of the slats 36 are supported on the foundation walls 12 and the interior end portion of the slats are supported by a pair of longitudinally extending beams 40 that rest upon the center foundation segments 28. The beams 40 preferably have a number of recesses 42 for receiving a wooden cross member 44 or the like, which support central walk way member 46. The walk way members 46 are secured to the cross members 44 through the use of lag screws or the like, and are therefore easily removable for access to the pit 30 as well as to any mechanical systems under the floor 34.

To increase the internal structural strength of the individual concrete slats 36, conventional steel reinforcing rods could be utilized. However, in accordance with another aspect of the present invention, each of the individual slats 36 has a hollow metal conduit 48 near the bottom of the slat and extending beyond the ends 38 as is shown in FIG. 6. Because the weight of the concrete in the slats 36 as well as the weight of the livestock is carried by the slats, the conduits 48 are positioned near the lower portion of the slats to provide tensional strength to the individual slats. Reinforcing is not required near the top portion of the slats, for concrete has sufficient compressive strength to accommodate the load being applied.

Historically, the pig has evolved from a swamp animal and has developed certain characteristics as a result of living in a humid and wet environment. As a consequence of living in such an environment, the pig did not develop sweat glands for external evaporative cooling, but instead relies upon conductive cooling and limited evaporative cooling air passing through its lungs. Therefore, environmental control of the confinement house is important to its healthy growth. Although the pig would favor having water and mud in which to wallow for cooling by conduction, such an environment is not conducive to its healthy growth. Additionally, totally air conditioned confinement houses may not be economical for pig and hog feeders and finishers. Recent experiments have found that pigs are quite comfortable laying on floors having temperature not in excess of approximately 80° F. The present invention utilizes a floor circulation system for controlling the temperature of the floor as well as an air control system for regulating air flow through the confinement house. The combination of these systems provides a healthy environment for feeding and finishing pigs and hogs from birth through market.

Accordingly, an important aspect of the present invention is the floor temperature controlling circulation system of the environmental control system. The floor circulation system is adapted to have a fluid, such as water, flowing therethrough. The fluid may be heated to raise the temperature of the floor as may be required during cold winter periods, or alternatively, the fluid may be cooled to maintain the floor temperature near or below 80° during extremely warm periods.

Referring to FIGS. 2 and 6, the floor circulation system includes two pairs of large conduits 50, 52 which extend substantially the length of the confinement house. Each of the pairs is comprised of a feeder line as well as a return line, with the pairs serving opposite sides of the floor as is shown in FIG. 6.

To control the temperature of the fluid passing through the pairs of the conduits 50, 52, a chiller unit 54 and a heating unit 56' (See FIGS. 2a and 2b) are connected to the pairs of conduits 50 and 52 by similarly sized connecting pairs of conduits 58. The connecting pairs of conduits 58 are suitably angled and terminated in conventional T-fittings 58' as is shown in FIG. 4. Each of the connecting conduits 58 has a shut off valve 60 which permits the fluid to alternatively flow from the heating unit 56' for heating the floor, or to circulate through the chiller 54 for cooling purposes.

Referring to FIGS. 2a and 2b and keeping in mind the fact that the younger pigs are placed in the left hand portion of the house, it is seen that the heating unit 56' is positioned in that portion of the house. Young pigs from birth up to weights approximating 40 lbs. are not of sufficient size to generate their own body heat in periods of cold weather, even in a well insulated building. A number of shut off valves 62 spaced along the pairs of conduits 50 and 52 permit zoned or sectional control of the floor circulation system to accommodate the animals' varying heat requirements.

During periods of extremely high temperatures, virtually all of the pigs and hogs in the confinement house will require cooling. The chiller unit 54 is placed in a central location so that the cooling fluid may circulate generally equally throughout the entire floor. However, since the pairs of conduits 50 and 52 are used for heating as well as cooling purposes, the shut off valves 62 may also be used to selectively cool zones of the house. It is noted however, that closing shut off valves 62 relatively closer to the boiler unit 56' or the chiller unit 54, of course, effectively shuts off those zones farther down stream from the units.

For circulating the temperature controlling fluid through the concrete floor 34, branch circuits originating from the pairs of conduits 50 and 52 are provided. Referring to FIG. 6, tap-offs 64 of T fittings or the like, are placed at regular intervals along the feeder and return lines of the conduits 50 and 52. Connection of the tap-offs 64 to the conduits 48 embedded in the individual concrete slats 36 is achieved by the use of section of polyvinylchloride tubing 66 or the like, which are suitably clamped or pressed fitted on the protruding ends of the conduits 48 as well as the tap offs 64. Although a greater or fewer number of conduits may be interconnected for a single branch circuit, good results have been achieved by interconnecting six adjacent conduits 48 as is shown. The opposite ends of the conduits are similarly connected so that a continuous branch circuit is established, enabling fluid to pass from the feeder conduit 50 through six adjacent conduits 48 to the return conduit 52. Recognizing that the fluid pressure may be greater nearer the pumping source, which may be either the chiller unit 54 or the heating unit 56', there may be a need for balancing the branch circuits so that substantially the same amount of fluid flows through each of the circuits. This is achieved through the use of balancing valves 68 placed near the tap offs 64 in the tubing 66. FIG. 7 illustrates the balancing valve 68 in an open position, while FIG. 8 illustrates a closed balancing valve. The valves may be of an inexpensive design being comprised essentially of a vane connected to a knob or the like by a through shaft in which the frictional force is sufficient to prevent the fluid from rotating the vane, but enabling manual rotation thereof.

In accordance with another aspect of the present invention, and particularly to the air control portion of the environmental control system (See FIGS. 1 and 3), a number of ventilating means indicated generally at 70 are intermittently spaced along the center line of the roof 18 and a number of air vents 72 are associated with the foundation walls 12 on opposite sides of the house.

To control the air flow through the house, the ventilating means 70 has a reversible fan 74' driven by an electric motor or the like (not shown) which may pull air from the exterior of the house through baffles 76 and drive the air downwardly to the interior of the house where it passes through the slotted floor 34 into the pit 30 and thereupon exits through the air vents 72. During periods of cold temperatures, this would be the preferred air flow direction when the floor circulation system was in a heating mode. It should also be noted that the animal wastes 32 in the disposal pit 30 form a useful liquid fertilizer by-product through organic breakdown, and that this bacterially activated organic breakdown ceases to exist at temperatures lower than about 40° F. Therefore, in extremely cold temperatures the air flowing downwardly through the heated slotted floor 34 helps to maintain the temperature of the waste in the disposal pit 30 above the minimum temperature thereby enabling the organic breakdown to continue.

To aid in the even flow of air throughout the interior area of the confinement house 10, a baffle 74a near the ventilating means 70 is provided to initially distribute the air flow laterally outwardly rather than passing it directly downwardly. This allows the cool air drawn from outside to mix with the warmer air within the house and thereby substantially prevents drafts of cold air reaching the pigs. Additionally, to further control the air flow within the confinement house, a number of partitions 74 are shown in FIGS. 2a and 2b. For very young pigs requiring a considerable amount of heat during cold weather, very little air movement may be desired in those areas so that the proper temperature can be maintained.

Alternatively, during periods of high temperatures when the floor circulation system is in a cooling mode, the fan 74' of the circulating means 70 will be reversed to pull fresh air in the air vents 72, into the pit 30, through the slotted concrete floor and upwardly where it is exhausted through the baffle 76. With the air flow moving upwardly from the floor, the space above the floor will also be cooled as the air passes through the cooled concrete slats 36.

Referring to FIG. 5, the air vent 72 in the illustrated embodiment includes a sheet metal enclosure having an open back that is attached to the foundation wall 12 and house wall 14. The enclosure has a screen 78 to prevent small animals or other objects from entering the pit. The upper tier of concrete blocks 24 are preferably placed on their sides in the immediate area of the air vent 72 so that the hollow cores of the blocks provide communication between the pit 30 and the air vent 72.

From the foregoing, it will be appreciated that the present confinement house represents a marked improvement in the art, in its economical and novel constructional features, as well as its economical operational and environmental control capabilities.

While the invention has been described herein in connection with certain preferred embodiments, it will be understood that the invention is not intended to be limited to those embodiments, but that it is intended to cover all alternative and equivalent constructions as may be included within the spirit and scope of the invention.

I claim as my invention:

1. In a livestock confinement house, the combination comprising:
a waste disposal pit, a slotted concrete floor positioned over said pit, conduit means located within said floor and positioned therein so as to reinforce the concrete, means for circulating a temperature controlled fluid through said conduit means so as to maintain the surface of said floor within a predetermined temperature range, and ventilating means for drawing outside air into said livestock confinement house and for selectively controlling the direction of air flow through said slotted floor.

2. The combination defined in claim 19 further comprising a plurality of air vents communicating with the space in said pit below said slotted floor.

3. The combination defined in claim 2 wherein said ventilating means are adapted to draw air into the confinement house and cause it to flow downwardly through said slotted floor and out through said air vents when said floor is being heated; and conversely adapted to draw air in through said air vents and to force the flow of air upwardly through said slotted floor when the floor is being cooled.

4. The combination defined in claim 1 wherein said slotted floor comprises a plurality of elongated concrete slats spanning said pit and separated from one another along the major portion of the length thereof to define the slots in said floor.

5. The combination defined in claim 4 wherein said conduit means comprises a plurality of interconnected metal pipes.

6. The combination defined in claim 5 wherein a metal pipe is positioned within the lower portion of each individual slat so as to reinforce said slat and to enable the selective temperature control of the surface thereof by the circulation of said temperature controlled fluid therethrough.

7. The combination defined in claim 1 including means for heating said fluid when it is desired to warm the surface temperature of said slotted floor and means for chilling said fluid when it is desired to cool the surface temperature of said slotted floor.

8. The combination defined in claim 1 including control means for selectively circulating said fluid through preselected areas of said floor so that the surface of said floor in said preselected areas are maintained within a predetermined temperature range.

9. The combination defined in claim 8 wherein said slotted floor comprises a plurality of elongated slats, and said conduit means comprises at least one set of main feeder and return conduits and a number of branch circuits, said branch circuits including a number of interconnected metal pipes located within said floor with one pipe positioned near the bottom of each slat.

10. The combination defined in claim 9 wherein each of said branch circuits has a single connection to one of said feeder conduits and one of said return conduits, said pipes in said branch circuits being interconnected by a flexible tubing means and said branch circuits being connected to said feeder and return conduits by said flexible tubing means.

11. The combination defined in claim 9 wherein said control means comprise a plurality of feeder and return conduit valves positioned along said conduits so as to divide said slotted floor into various sections such that the temperature of the fluid in said various sections can be respectively controlled within different temperature ranges.

12. The combination defined in claim 11 including a plurality of branch circuit balancing valves positioned in each of said branch circuits to equalize the flow of fluid through each of said branch circuits relative to the other branch circuits.

* * * * *